US011424788B2

(12) United States Patent
Nilsson et al.

(10) Patent No.: US 11,424,788 B2
(45) Date of Patent: Aug. 23, 2022

(54) BEAM-FORMED SIGNAL TRANSMISSION FROM A NETWORK NODE

(71) Applicant: Telefonaktiebolaget LM Ericsson (publ), Stockholm (SE)

(72) Inventors: Andreas Nilsson, Gothenburg (SE); Fredrik Athley, Kullavik (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 52 days.

(21) Appl. No.: 17/267,904

(22) PCT Filed: Aug. 31, 2018

(86) PCT No.: PCT/EP2018/073426
§ 371 (c)(1),
(2) Date: Feb. 11, 2021

(87) PCT Pub. No.: WO2020/043301
PCT Pub. Date: Mar. 5, 2020

(65) Prior Publication Data
US 2021/0234575 A1 Jul. 29, 2021

(51) Int. Cl.
*H04B 7/04* (2017.01)
*H04B 7/0408* (2017.01)
(Continued)

(52) U.S. Cl.
CPC ......... *H04B 7/0408* (2013.01); *H04B 7/0617* (2013.01); *H04L 5/0048* (2013.01)

(58) Field of Classification Search
CPC .... H04B 7/0408; H04B 7/0617; H04L 5/0048
See application file for complete search history.

(56) References Cited

U.S. PATENT DOCUMENTS

2014/0334566 A1 11/2014 Kim et al.
2015/0244433 A1* 8/2015 Jindal .................. H04B 7/0689 375/267

(Continued)

FOREIGN PATENT DOCUMENTS

KR 20170068090 A * 6/2017 ........... H04B 7/0617
TW 201136358 A * 10/2011 ............. H01Q 13/10

(Continued)

OTHER PUBLICATIONS

International Search Report and Written Opinion dated Mar. 25, 2019 for International Application No. PCT/EP2018/073426 filed on Aug. 31, 2018, consisting of 12-pages.

*Primary Examiner* — Jean B Corrielus
(74) *Attorney, Agent, or Firm* — Christopher & Weisberg, P.A.

(57) ABSTRACT

There is provided mechanisms for beam-formed signal transmission. A method is performed by a network node. The method includes transmitting a reference signal in a set of transmission beams. The includes receiving reporting from a terminal device having received the reference signal. The reporting identifies N>1 transmission beams in the set of transmission beams. The includes generating a new transmission beam as a combination of at least two of the N>1 reported transmission beams. The includes transmitting at least one of control signalling and data signalling in the new transmission beam and to the terminal device.

20 Claims, 7 Drawing Sheets

S102
Transmit reference signal

S104
Instruct terminal device to identify only beams with low spatial correlation S106
Instruct terminal device to only report one beam per antenna array S108
Receive reporting of N>1 beams S110
Generate new TX beam S112
Transmit reference signal in new transmission beam S114
Transmit control and/or data in new TX beam

(51) Int. Cl.
*H04B 7/06* (2006.01)
*H04L 5/00* (2006.01)

(56) References Cited

U.S. PATENT DOCUMENTS

2016/0099763 A1* 4/2016 Chen ...................... H04B 7/063
370/329
2017/0332249 A1* 11/2017 Guey ..................... H04B 7/084

FOREIGN PATENT DOCUMENTS

WO 2017048311 A1 3/2017
WO WO-2018190495 A1 * 10/2018 ........... H04B 7/0408

* cited by examiner

BEAM-FORMED SIGNAL TRANSMISSION FROM A NETWORK NODE

CROSS-REFERENCE TO RELATED APPLICATION

This application is a Submission Under 35 U.S.C. § 371 for U.S. National Stage Patent Application of International Application Number: PCT/EP2018/073426, filed Aug. 31, 2018 entitled "BEAM-FORMED SIGNAL TRANSMISSION FROM A NETWORK NODE," the entirety of which is incorporated herein by reference.

TECHNICAL FIELD

Embodiments presented herein relate to a method, a network node, a computer program, and a computer program product for beam-formed signal transmission.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the wireless devices might be required to reach a sufficient link budget.

Narrow beam transmission and reception schemes might be needed at such high frequencies to compensate the expected high propagation loss. For a given communication link, a respective beam can be applied at both the network-end (as represented by a network node or its transmission and reception point, TRP) and at the terminal-end (as represented by a terminal device), which typically is referred to as a beam pair link (BPL). One task of the beam management procedure is to discover and maintain beam pair links. A BPL (i.e. both the beam used by the network node and the beam used by the terminal device) is expected to be discovered and monitored by the network using measurements on downlink reference signals, such as channel state information reference signals (CSI-RS) or synchronization signal block (SSB) signals, used for beam management.

The CSI-RS for beam management can be transmitted periodically, semi-persistently or aperiodically (event triggered) and they can be either shared between multiple terminal devices or be device-specific. The SSB are transmitted periodically and are shared for all terminal devices. In order for the terminal device to find a suitable network node beam, the network node transmits the reference signal in different transmission (TX) beams on which the terminal device performs measurements, such as reference signal received power (RSRP), and reports back the M best TX beams (where M can be configured by the network). Furthermore, the transmission of the reference signal on a given TX beam can be repeated to allow the terminal device to evaluate a suitable reception (RX) beam.

There are basically three different implementations of beamforming at the TRP; analog beamforming, digital beamforming, or hybrid beamforming. Each implementation has its advantages and disadvantages. A digital beamforming implementation is the most flexible implementation of the three but also the costliest due to the large number of required radio chains and baseband chains. An analog beamforming implementation is the least flexible but cheaper to manufacture due to a reduced number of radio chains and baseband chains compared to the digital beamforming implementation. A hybrid beamforming implementation is a compromise between the analog and the digital beamforming implementations. As the skilled person understands, depending on cost and performance requirements of different terminal devices, different implementations will be needed. A panel might be regarded as an antenna array of single- or dual-polarized antenna elements with typically one transmit/receive unit (TXRU) per polarization. An analog distribution network with phase shifters is used to steer the beam of each panel.

One issue with operatively connecting the terminal device to the network node via narrow beams in order to establish a BPL is that the BPL could easily be deteriorated, for example if a physical object is placed between the network node and the terminal device and thus causes blocking of the BPL. Due to high penetration loss and poor diffraction properties at high frequencies such a Mocking physical object can lead to lost connection between the network node and the terminal device, for example such that the terminal device cannot correctly decode, or perhaps not even receive, the control channel which might lead to dropped calls, or interrupted data transmissions, and resulting bad user experience.

Hence, there is still a need for improved mechanisms for beam-formed signal transmission enabling a link between the network node and the terminal device to be maintained even when narrow beams are used for the communication between the network node and the terminal device in the presence of blocking physical objects.

SUMMARY

An object of embodiments herein is to provide efficient beam-formed signal transmission that does not suffer from the issues noted above, or at least where the above noted issues are mitigated or reduced.

According to a first aspect there is presented a method for beam-formed signal transmission. The method is performed by a network node. The method comprises transmitting a reference signal in a set of transmission beams. The method comprises receiving reporting from a terminal device having received the reference signal. The reporting identifies N>1 transmission beams in the set of transmission beams. The method comprises generating a new transmission beam as a combination of at least two of the N>1 reported transmission beams. The method comprises transmitting at least one of control signalling and data signalling in the new transmission beam and to the terminal device.

According to a second aspect there is presented a network node for beam-formed signal transmission. The network node comprises processing circuitry. The processing circuitry is configured to cause the network node to transmit a reference signal in a set of transmission beams. The processing circuitry is configured to cause the network node to receive reporting from a terminal device having received the reference signal. The reporting identifies N>1 transmission beams in the set of transmission beams. The processing circuitry is configured to cause the network node to generate a new transmission beam as a combination of at least two of the N>1 reported transmission beams. The processing circuitry is configured to cause the network node to transmit at least one of control signalling and data signalling in the new transmission beam and to the terminal device.

According to a third aspect there is presented a network node for beam-formed signal transmission. The network node comprises a transmit module configured to transmit a reference signal in a set of transmission beams. The network node comprises a receive module configured to receive reporting from a terminal device having received the reference signal. The reporting identifies N>1 transmission beams in the set of transmission beams. The network node comprises a generate module configured to generate a new transmission beam as a combination of at least two of the N>1 reported transmission beams. The network node comprises a transmit module configured to transmit at least one of control signalling and data signalling in the new transmission beam and to the terminal device.

According to a fourth aspect there is presented a computer program for beam-formed signal transmission, the computer program comprising computer program code which, when run on a network node, causes the network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this provides efficient beam-formed signal transmission.

Advantageously, the proposed beam-formed signal transmission does not suffer from the issues noted above.

Advantageously the proposed beam-formed signal transmission increases the robustness for control channel signalling, which will reduce the risk for a beam link failure, and hence reduce the risk of dropped calls, or interrupted data transmission, and bad user experience.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
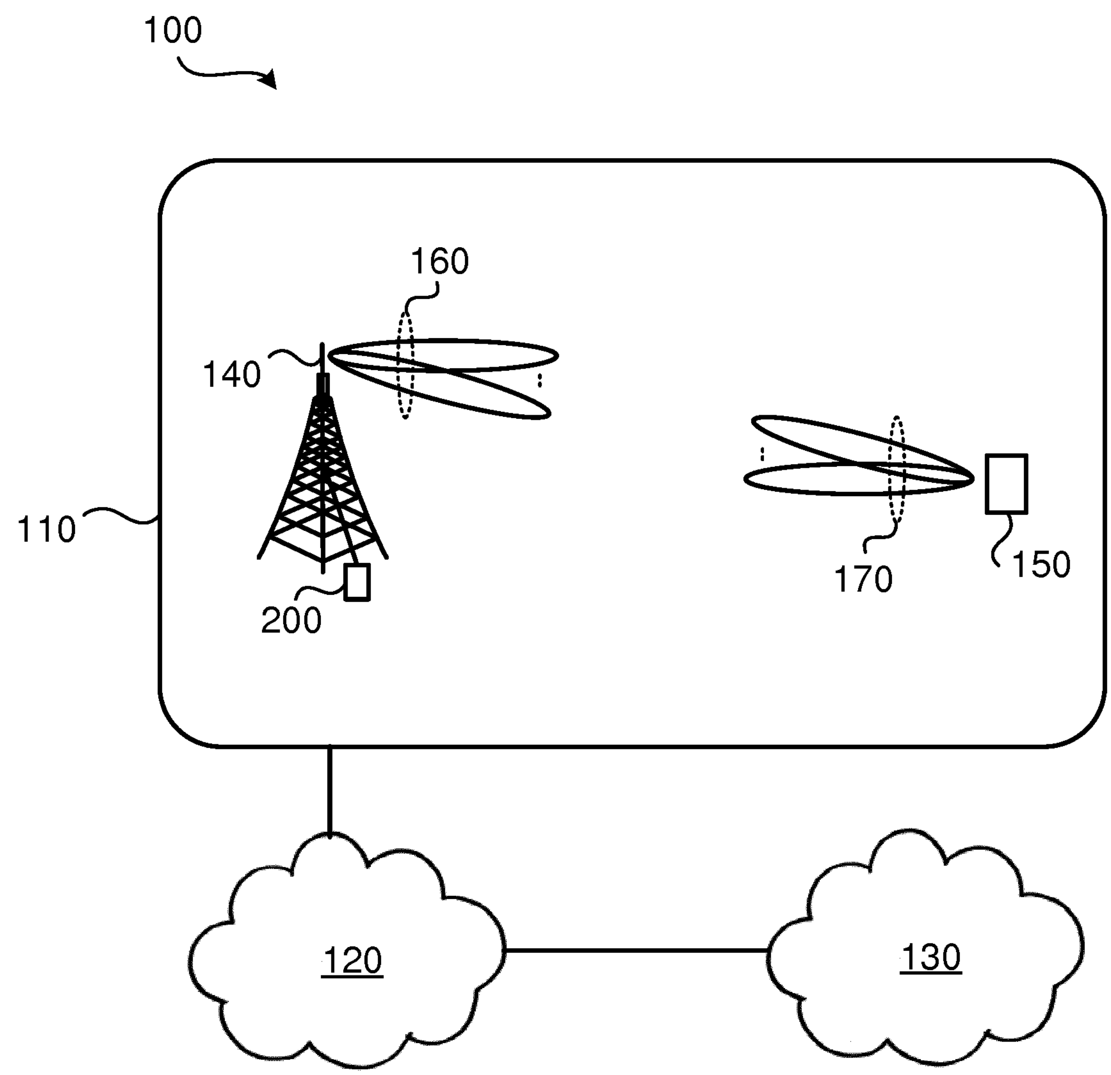
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (5G) telecommunications network, or a fifth (5G) telecommunications network and support any 3GPP telecommunications standard, where applicable.

The communications network 100 comprises a network node 200 configured to provide network access to at least one terminal device 150 in a radio access network 110. The radio access network 110 is operatively connected to a core network 120. The core network 120 is in turn operatively connected to a service network 130, such as the Internet. The terminal device 150 is thereby enabled to, via the network node 200, access services of, and exchange data with, the service network 130.

Examples of network nodes 200 are radio access network nodes, radio base stations, base transceiver stations, Node Bs, evolved Node Bs, g Node Bs, access points, and access nodes, and backhaul nodes. Examples of terminal devices 150 are wireless devices, mobile stations, mobile phones, handsets, wireless local loop phones, user equipment (UE), smartphones, laptop computers, tablet computers, network equipped sensors, network equipped vehicles, and so-called Internet of Things devices.

The network node 200 comprises, is collocated with, is integrated with, or is in operational communications with, a TRP, 140.

The network node 200 (via its TRP 140) and the terminal device 150 are configured to communicate with each other in respective sets of beams 160, 170.

As disclosed above a beam management procedure involving beam training at the terminal device 150 can be used to establish a BPL comprising one of the beams 160 and one of the beams 170. Issues with existing procedures for maintaining a BPL have been noted above.

Figure 2:
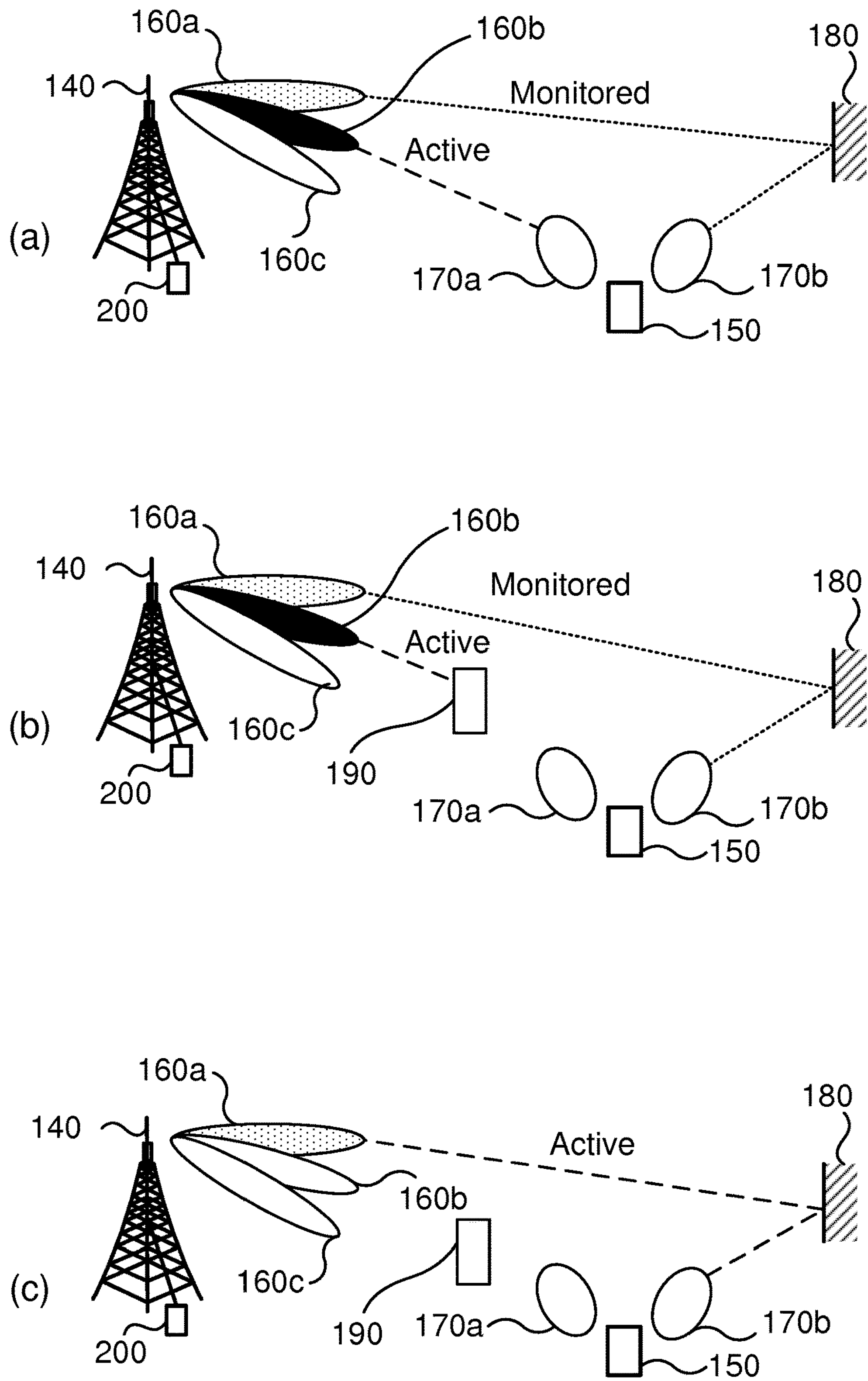
FIGS. 2, 4, and 6 schematically illustrate parts of the communications network in FIG. 1.

As an illustrative example, consider the example in FIG. 2. In the illustrative example of FIG. 2, the network node 200 is configured for communication in beams 160*a*, 160*b*, 160*c*, and the terminal device 150 is configured for communication in beams 170*a*, 170*b*. In the example of FIG. 2 the terminal device 150 might use two or more panels, preferably pointing in different directions, in order to improve the coverage and increase the order of spatial multiplexing. Hence, beam 170_a_ can be generated at one panel and beam 170_b_ at another panel.

In FIG. 2(_a_) the network node 200 and the terminal device 150 communicate in beam 160_b_ at the network node side and in beam 170_a_ at terminal device side. These beams 160_b_, 170_a_ thus define an active BPL. The terminal device 150 also monitors transmission from beam 160_a_ at the network node 200 in beam 170_b_, where the transmission from beam 160_a_ is reflected by a physical object 180. These beams 160_a_, 170_b_ thus define a monitored BPL. For example, the network node 200 and the terminal device 150 might use the active BPL for data communication, whilst the monitored BPL is used for communication of control signals but not for data communication.

In FIG. 2(_b_) a physical object 190 is placed such that it causes the transmission in beam 160_b_ from the network node 200 to be blocked, thus causing a BPL failure for the active BPL. Since the terminal device 150 can still receive control signals in the monitored BPL the monitored BPL can be used as backup for continued data communication between the network node 200 and the terminal device 150. As in FIG. 2(_c_) the terminal device 150 has performed a switch such that the previously monitored BPL now defines the active BPL and is used for data communication (and communication of control signals).

Another procedure to find a new BPL in case of BPL failure is referred to as a beam link failure procedure. The beam link failure procedure is used when the active BPL gets blocked to find a new candidate BPL. However, the beam link failure procedure requires some undesired overhead signaling and also introduces latency in the system. In general terms the beam link failure procedure consists of four parts; beam failure detection, new candidate beam identification, beam failure recover request transmission, and terminal device monitoring. These four parts will hereinafter be disclosed in more detail.

Beam failure detection: The terminal device 150 detects beam failure by monitoring a dedicated reference signal (such as CSI-RS or SSB) and assesses if a trigger condition has been met. The trigger condition could be based on the block error rate (BLER) for a hypothetical PDCCH based on the measurements on the dedicated reference signal. A trigger condition is met (i.e. a beam link failure is declared) if the BLER for the hypothetical PDCCH is below a given threshold for X number of consecutive occasions (where X is configurable).

New candidate beam identification: In order to quickly find a candidate BPL after a beam link failure the terminal device 150 constantly monitors (e.g. measures reference signal received power (RSRP) on beam identification reference signals, which for example can be SSB (or periodic CSI-RS if configured)). Since SSB might be beam-formed at higher frequencies to attain coverage, the terminal device 150 might determine a preferred candidate SSB and corresponding beam used by the network node 200 based on these measurements. Since that each SSB consists of four orthogonal frequency-division multiplexing (OFDM) symbols, the terminal device 150 can also perform a beam sweep during each SSB transmission, and hence it is possible for the terminal device 150 to determine both a preferred beam to be used by the network node 200 and a preferred beam to be used by the terminal device 150 for the candidate BPL.

Beam failure recover request transmission: When the terminal device 150 has declared a beam link failure and a new candidate beam has been determined, the terminal device 150 transmits a beam failure recovery request (BFRQ) towards the network node 200 to notify the network node 200 about the beam link failure. The BFRQ might be transmitted on the physical random access channel (PRACH) which implicitly informs the network node 200 about the preferred beam to be used by the network node 200.

Terminal device monitoring: The terminal device 150 monitors the response from the network node 200 for a beam failure recovery request response on the new candidate beam pair link to finalize the beam link recovery procedure.

In conclusion, existing procedures for maintaining a BPL are either inefficient or require large signalling overhead.

In view of the above there is thus a need for efficient beam-formed signal transmission that does not suffer from these issues, or at least where the above noted issues are mitigated or reduced.

The embodiments disclosed herein therefore relate to mechanisms for beam-formed signal transmission. In order to obtain such mechanisms there is provided a network node 200, a method performed by the network node 200, a computer program product comprising code, for example in the form of a computer program, that when run on a network node 200, causes the network node 200 to perform the method.

Figure 3:
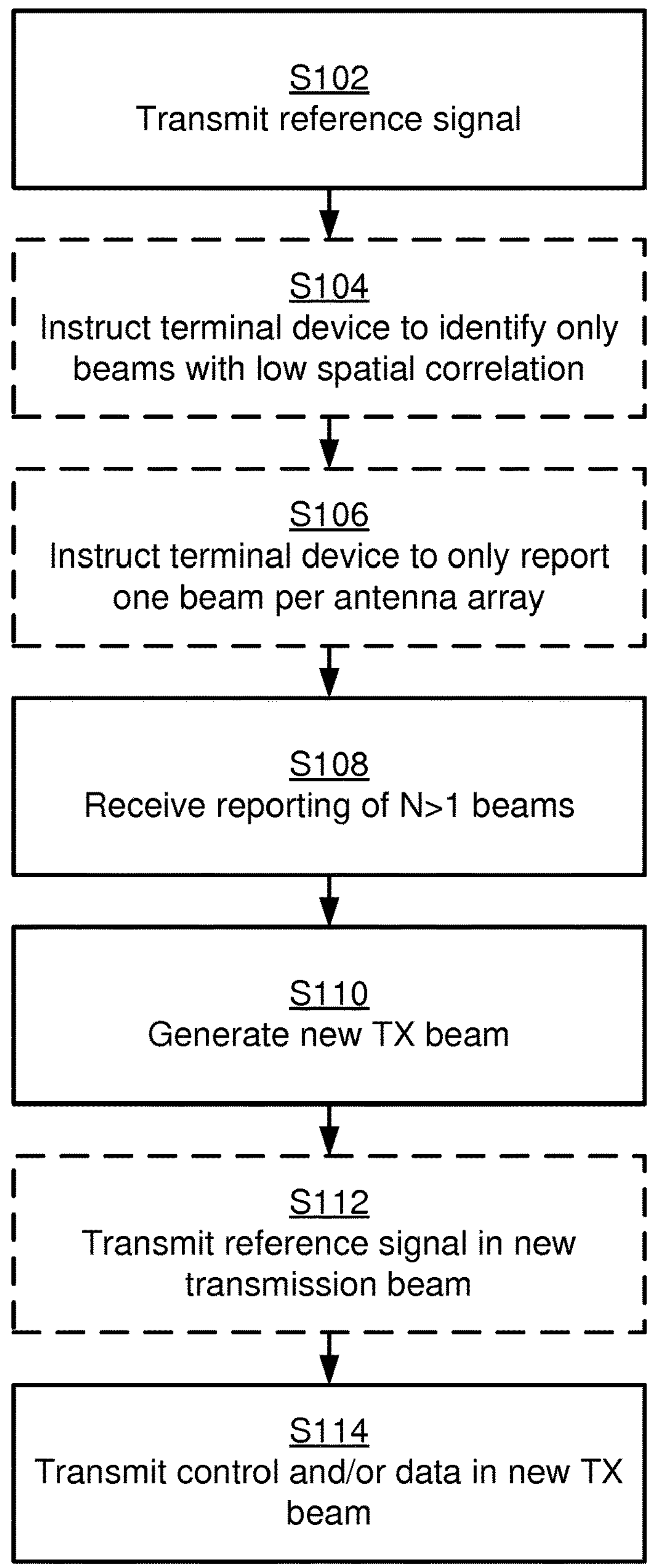
FIG. 3 is a flowchart of methods according to embodiments.

FIG. 3 is a flowchart illustrating embodiments of methods for beam-formed signal transmission. The methods are performed by the network node 200. The methods are advantageously provided as computer programs 1120.

In order for the network node 200 to obtain information regarding which transmission beam to use for communication with the terminal device 1150 it transmits reference signals. Hence, the network node 200 is configured to perform step S102:

S102: The network node 200 transmits a reference signal in a set of transmission beams 160.

It is assumed that the terminal device 150 receives the reference signal as transmitted in at least some of the transmission beams 160 and that the terminal device 150 reports back the N>1 best transmission beams. Hence, the network node 200 is configured to perform step S108:

S108: The network node 200 receives reporting from a terminal device 150 having received the reference signal. The reporting identifies N>1 transmission beams in the set of transmission beams 160.

Based on the reported N>1 transmission beams from the terminal device 150, the network node 200 designs a new transmission beam for this terminal device 150. The new transmission beam covers two or more of the best reported N>1 transmission beams. Thus the network node 200 is configured to perform step S110:

S110: The network node 200 generates a new transmission beam as a combination of at least two of the N>1 reported transmission beams.

The network node 200 then uses this new transmission beam for control signalling and/or data signalling. Thus the network node 200 is configured to perform step S114:

S114: The network node 200 transmits at least one of control signalling and data signalling to the terminal device 150. The at least one of control signalling and data signalling is transmitted in the new transmission beam.

In Long Term Evolution (LTE) and New Radio (NR) terminology the network node 200 might thus use the new transmission beam for physical downlink control channel (PDCCH) transmission and/or physical downlink shared channel (PDSCH) transmission.

Embodiments relating to further details of beam-formed signal transmission as performed by the network node 200 will now be disclosed.

There could be different number of transmission beams, and hence different values of N, that the terminal device 150 reports back to the network node 200. Particularly, according to an embodiment N=2.

As disclosed above, the network node 200 could utilize analog beamforming, digital beamforming, or hybrid beamforming. Particularly, according to an embodiment analog beamforming is utilized when the new transmission beam is generated.

There may be different ways for the network node 200 to determine which at least two of the N>1 reported transmission beams to use when generating the new transmission beam.

In some aspects only those of the N>1 reported transmission beams where the received power differs less than a threshold are combined. Particularly, according to an embodiment the new transmission beam is generated for a combination only of those of the N>1 reported transmission beams having a reported difference in received power being smaller than a threshold power value. Hence, this will require the terminal device 150 to report received power per reported transmission beam. The received power might be expressed in terms of reference signal received power (RSR).

In some aspects only those of the N>1 reported transmission beams which differ in angular direction larger than threshold are combined. Particularly, according to an embodiment the new transmission beam is generated for a combination only of those of the N>1 reported transmission beams having an angular separation being larger than a first threshold angular value. This might result in that adjacent transmission beams (in angular sense) are not combined since the potential gain is small.

There may be different ways for the network node 200 to generate the new transmission beam. In some aspects the new transmission beam is defined in terms of antenna weights and generation of the new transmission beam thus involves determination of antenna weights. Particularly, according to an embodiment generating the new transmission beam comprises determining an antenna weight vector for the new transmission beam.

The antenna weight vector can be derived in different ways. In more detail, in order for the network node 200 to generate the new transmission beam, proper phase and/or amplitude settings are needed. The phase and/or amplitude settings are defined by the complex-valued elements of the antenna weight vector.

According to one aspect the complex-valued antenna weight vectors of the at least two of the N>1 reported transmission beams that should be combined are added. Particularly, according to an embodiment each of the N>1 reported transmission beams is associated with a respective antenna weight vector wi, for i=1 . . . N, and wherein the antenna weight vector of the new transmission beam is determined as a summation of the respective antenna weight vectors wi of the at least two of the N>1 reported transmission beams.

As an example, assume that two reported transmission beams with antenna weight vectors w1 and w2 are to be combined. Then the antenna weight vector, w3, for the new transmission beam would be w3=w1+w2. It could be that the elements of the weight vector w3 will have slightly different amplitude for the different antenna elements within the antenna array at the TRP 140, which will slightly reduce the power amplifier efficiency.

In general terms, each of the at least two of the N>1 reported transmission beams has its own first beam pattern and the antenna weight vector for the new transmission beam has a second beam pattern. According to one aspect the antenna weight vector for the new transmission beam is determined by that second beam pattern that best matches a target beam pattern. The target beam pattern is determined from the first beam patterns of the at least two of the N>1 reported transmission beams. There could be different ways to determine which second beam pattern that best matches the target beam pattern. One example is to find the antenna weight vector that generates a second beam pattern that has a best least squares fit with the target beam pattern.

As an example, an optimization routine can be executed that evaluates different antenna weight vectors in order to achieve the desired new transmission beam. For example, it could be that the desired target beam pattern is be physically unrealizable, but a least squares fit could find the physically realizable beam pattern that best matches the desired target beam pattern.

According to one aspect, if the at least two of the N>1 reported transmission beams are close in angular space the antenna weight vector might be determined so as to generate one broad new transmission beam that covers all the at least two of the N>1 reported transmission beams. Particularly, according to an embodiment, when at least two of the N>1 reported transmission beams have an angular separation smaller than a second threshold angular value, the antenna weight vector of the new transmission beam is determined to generate a new transmission beam having one broad main lobe covering the at least two of the N>1 reported transmission beams.

According to one aspect, in case the new transmission beam is to be transmitted from an analog antenna array and that analog antenna array is dual-polarized, so-called dual-polarized beamforming (DPBF), as disclosed in documents WO2011/050866A1 and WO2016141961 A1, can be applied to generate beams with any beam width (limited only by the physical properties of the antenna array itself). Particularly, according to an embodiment the antenna weight vector of the new transmission beam is to be applied to antenna elements of a first polarization and a second polarization, and wherein the antenna weights of the new transmission beam are defined by phase shifts only. This yields flexibility in terms of enabling generation of different types (in terms of beam pattern) of new transmission beams without losing power amplifier efficiency.

In some aspects there are requirements on the reporting of the N>1 transmission beams from the terminal device 150. Examples of such requirements will now be disclosed.

According to a first example there is a requirement that the terminal device 150 only is to report those transmission beams having a low spatial correlation. Particularly, according to an embodiment the network node 200 is configured to perform (optional) step S104:

S104: The network node 200 instructs the terminal device 150 to, in the reporting, identify only those transmission beams having a spatial correlation being lower than a threshold correlation value when received at the terminal device 150. This might thus require the terminal device 150 to obtain an estimate of the spatial correlation of the transmission beams.

In case the terminal device 150 has two or more antenna arrangements, such as two or more panels, there is a possibility that the two best transmission beams corresponds to two paths that are received at the same antenna arrangements at the terminal device 150. If so and if the network node 200 performs a beam training procedure for the terminal device 150 and using the new transmission beam, there is a risk that the terminal device 150 will determine a reception beam that only captures the single best BPL. According to a second example there is thus a requirement that for a terminal device 150 with two or more antenna arrays, the terminal device 150 is to report beams from at least two different antenna arrays (such as one best beam per antenna arrays).

Thus, the terminal device 150 might be configured to receive the reference signal using at least two antenna arrangements. According to an embodiment and the network node 200 is aware of number of antenna arrangements to be used by the terminal device 150 for receiving the reference signal and is configured to perform (optional) step S106:

S106: The network node 200 instructs the terminal device 150 to, in the reporting, identify one transmission beam for each one of the at least two antenna arrangements.

Hence, the network node 200 might configure the terminal device 150 to consider highest RSRP as well as lowest spatial correlation and/or one or more transmission beam as received per antenna arrangement when determining which N>1 transmission beams to report back to the network node 200 in order to facilitate the chance of for example higher order spatial multiplexing or diversity schemes.

In some aspects the terminal device 150 is to perform beam training before or after the reporting of the N>1 transmission beams.

When the terminal device 150 is to perform beam training before the reporting of the N>1 transmission beams the network node 200 might, according to a first example, transmit a set of reference signals in each transmission beam in the set of transmission beams 160 before receiving the reporting from the terminal device 150. Particularly, according to an embodiment the reference signal is to be received in a set of receive beams 170 by the terminal device 150. The network node 200 is aware of number of receive beams in the set of receive beams 170. A set of reference signals is transmitted in the set of transmission beams 160. The set of reference signals consist of as many occurrences of the reference signal as the number of receive beams. Alternatively, according to a second example, the network node 200 might transmit a set of reference signals in a single broad transmission beam before receiving the reporting from the terminal device 150.

When the terminal device 150 is to perform beam training after the reporting of the N>1 transmission beams the network node 200 might transmit a set of reference signals in the new transmission beam before control and/or data signalling is transmitted. The terminal device 150 is to perform beam training using a set of receive beams 170 on the new transmission beam. Particularly, according to an embodiment the network node 200 is aware of number of receive beams in the set of receive beams 170 and is configured to perform (optional) step S112:

S112: The network node 200 transmits, in the new transmission beam and before transmitting the at least one of control signalling and data signalling, as many occurrences of the reference signal as the number of receive beams.

Figure 4:
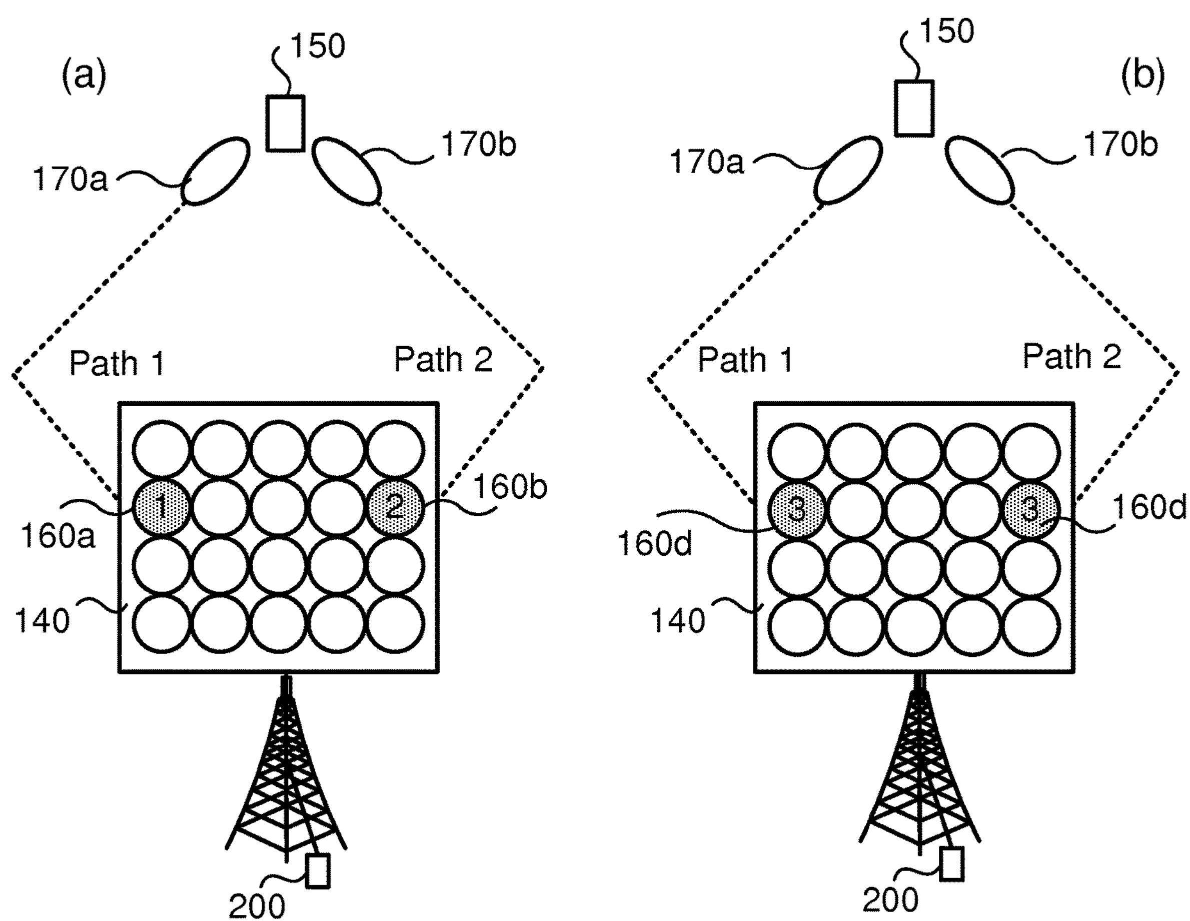

FIG. 4 schematically illustrates an example where the network node 200 via its TRP 140 uses beam-forming and a number of transmission beams (as illustrated by the circles) for communicating with a terminal device 150 using two reception beams 1170*a*, 170*b* pointing in different directions. The terminal device 150 reports back the two best transmission beams 160*a*, 160*b* (also denoted "1" and "2" in FIG. 4(*a*)) and their corresponding RSRP to the network node 200. The network node 200 generates a new transmission beam 160*d* (denoted "3" in FIG. 4(*b*)) covering both transmission beams 160*a*, 160*b*.

Figure 5:
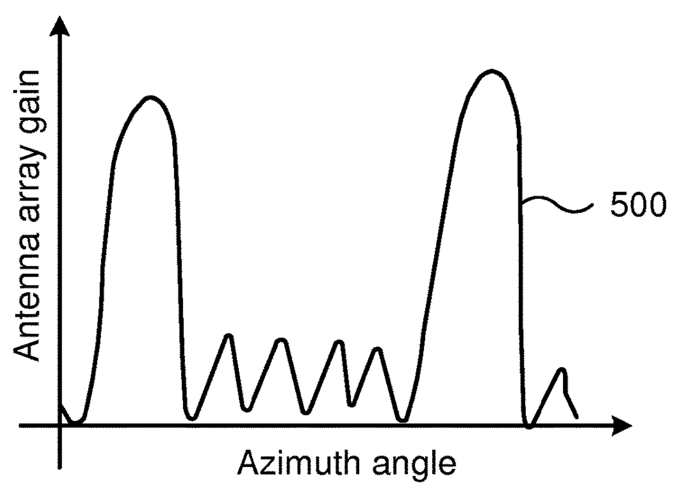
FIGS. 5 and 7 schematically illustrate beam patterns according to embodiments.

FIG. 5 schematically illustrates the beam pattern 500 (in terms of antenna array gain as function of azimuth angle) for the new transmission beam 160*d* in FIG. 4.

Figure 6:
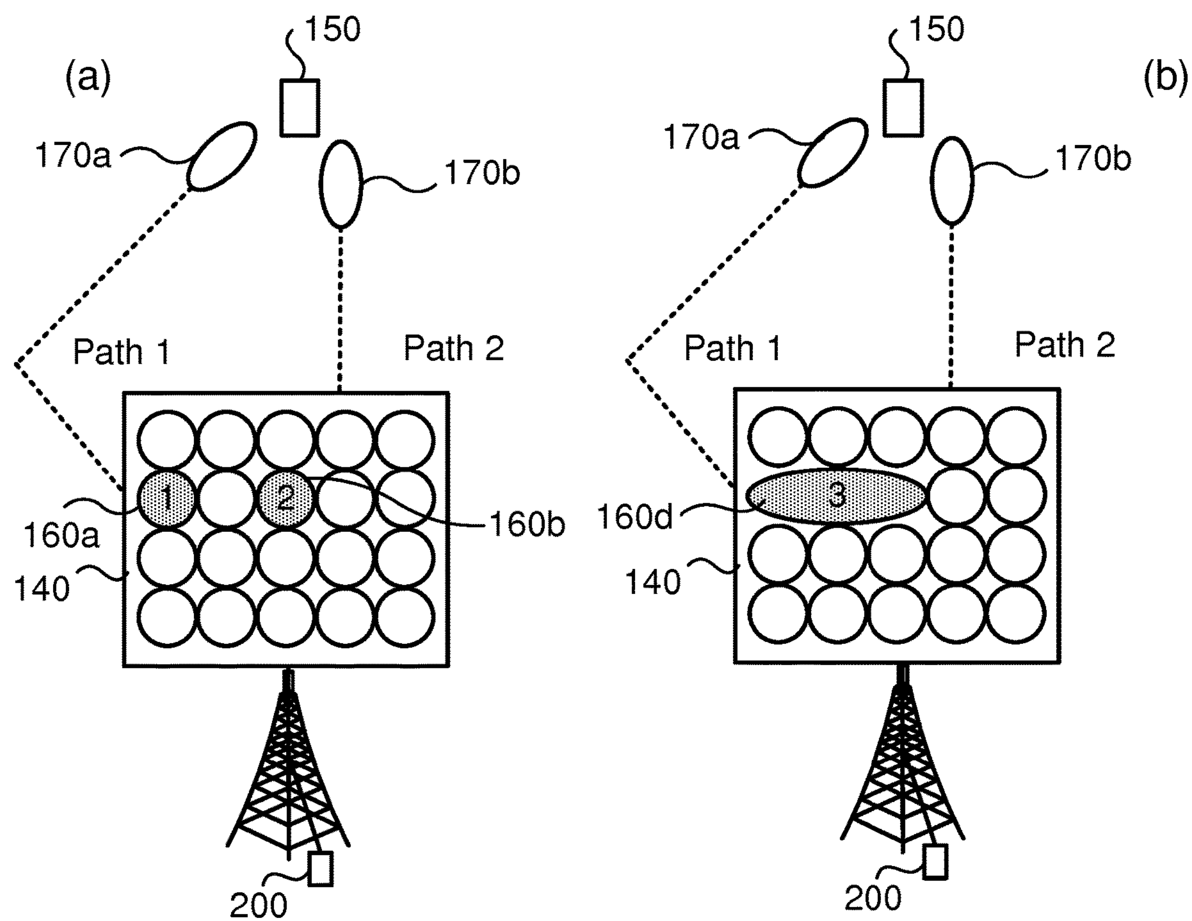

FIG. 6 another example where the network node 200 via its TRP 140 uses beam-forming and a number of transmission beams (as illustrated by the circles) for communicating with a terminal device 150 using two reception beams 170*a*, 170*b* pointing in different directions. The terminal device 150 reports back the two best transmission beams 160*a*, 160*b* (also denoted "1" and "2" in FIG. 6(*a*)) and their corresponding RSRP to the network node 200. In the illustrative example of FIG. 6 the two beams 160*a*, 160*b* corresponding to the different paths ("Path 1" and "Path 2") are located rather close to each other in the angular domain, and the network node 200 generates a new transmission beam 160*d* (also denoted "3" in FIG. 6(*b*)) covering both transmission beams 160*a*, 160*b* and the TRP TX beam located there in-between.

Figure 7:
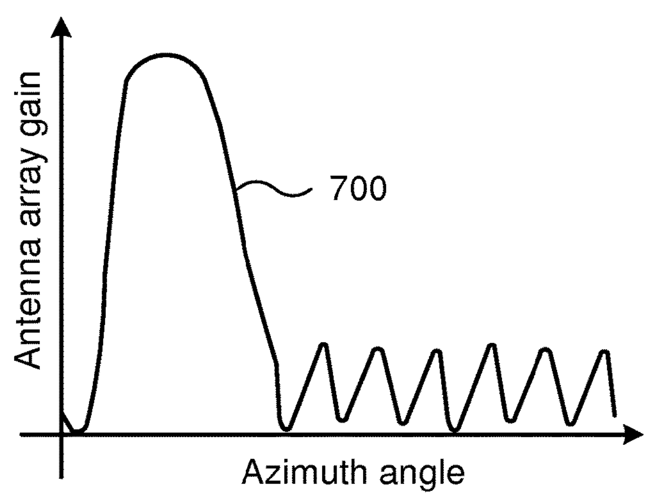

FIG. 7 schematically illustrates the beam pattern 700 (in terms of antenna array gain as function of azimuth angle) for the new transmission beam 160*d* in FIG. 6.

As disclosed above, for both FIG. 4 and FIG. 6, the network node 200 then utilizes the new transmission beam 160*d* for control and/or data transmission in order to attain a more robust transmission of control signalling and/or data signalling. The terminal device 150 thus experiences two paths ("Path 1" or "Path 2") although only one new transmission beam 160*d* is generated. In case one of the two paths gets blocked, there is thus a large probability that communication in the other path can continue without interruption.

Figure 8:
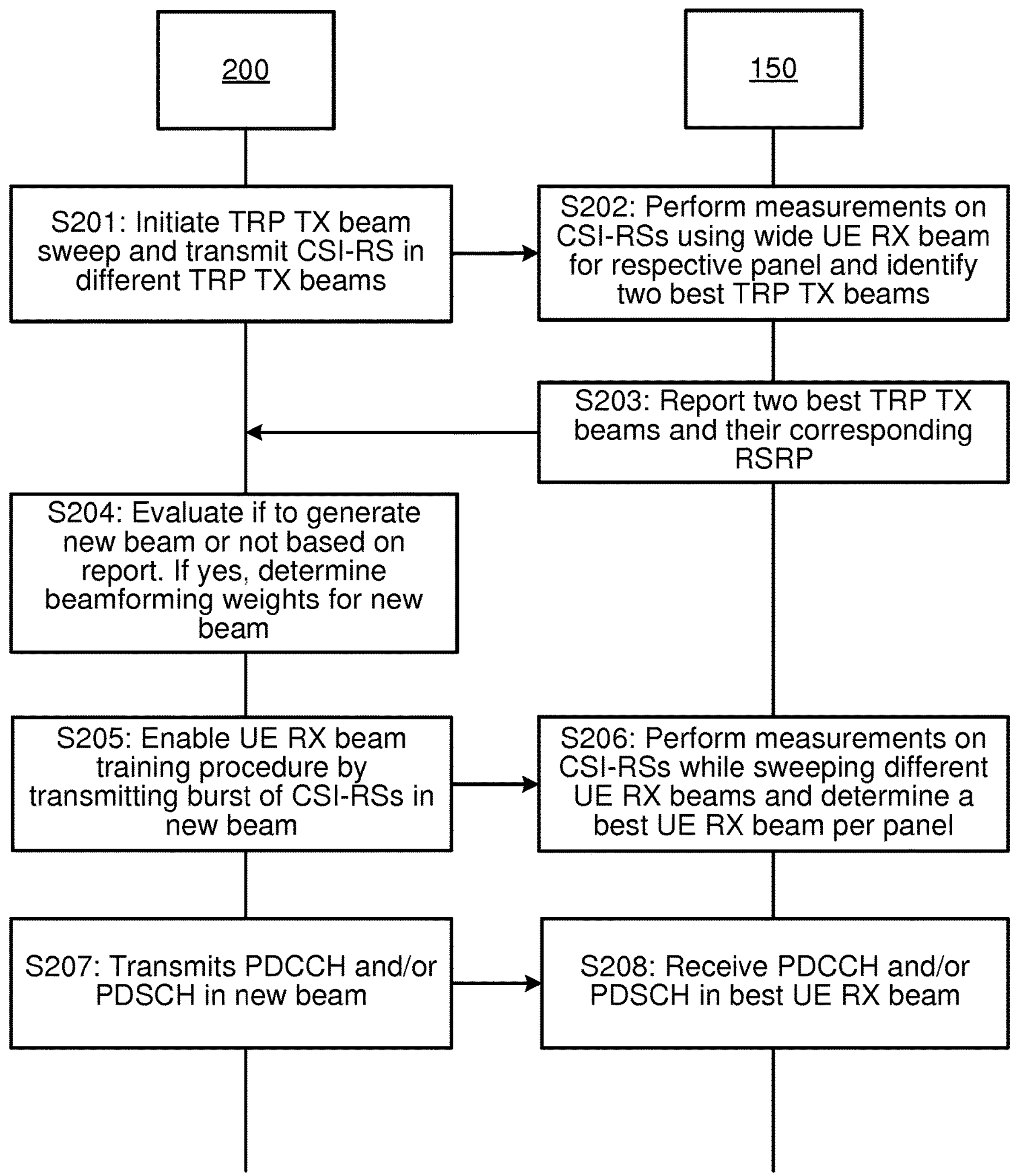
FIG. 8 is a signalling diagram according to an embodiment.

One particular embodiment for beam-formed signal transmission as performed by the network node 200 and based on at least some of the above disclosed embodiments will now be disclosed with reference to the signalling diagram of FIG. 8.

S201: The network node 200 initiates a TRP TX beam sweep by transmitting CSI-RS in different narrow TRP TX beams. One way to implement step S201 is to perform step S102.

S202: The terminal device 150 performs measurements on the CSI-RS in order to identify the two best TRP TX beams (such as one best TRP TX beam per panel). The terminal device 150 utilizes a wide UE RX beam per panel in order to capture all possible propagation paths.

S203: The terminal device 150 reports back the two best TRP TX beams and their corresponding RSRP to the network node 200 that thus receives the reporting. One way to implement the part performed by the network node 200 in step S203 is to perform step S108.

S204: The network node 200 evaluates if to generate a new TRP TX beam or not based on the report. If the criterion is met, the network node 200 determines beamforming weights (such as a complex-valued antenna weight vector) for the new TRP TX beam such that the new beam will have similar coverage as both the reported best beams. Some different ways to determine these beamforming weights have been disclosed above. One way to implement step S204 is to perform step S110.

S205: The network node 200 enables the terminal device 150 to perform a UE RX beam training procedure by transmitting a burst of CSI-RSs in the new TRP TX beam. One way to implement step S205 is to perform step S112.

S206: The terminal device 150 receives the burst of CSI-RSs in different UE RX beams in order to determine a best UE RX beam.

S207: The network node 200 transmits data and/or control signalling (such as PDCCH and/or PDSCH) in the new TRP TX beam. One way to implement step S207 is to perform step S114.

S208: The terminal device 150 receives the data and/or control signalling in the determined best UE RX beam.

It is noted that although some beams above have been referred to transmission beams and other beams as reception beams, the transmission beams can also be used for reception and the reception beams can also be used for transmission.

It is noted that although some embodiments and examples have been described for a terminal device 150 with two or more antenna arrays, or panels, the herein disclosed inventive concept is applicable also for a terminal device 150 having a single antenna array, or a single panel, as well as for a terminal device 150 without any beamforming capabilities at all.

Figure 9:
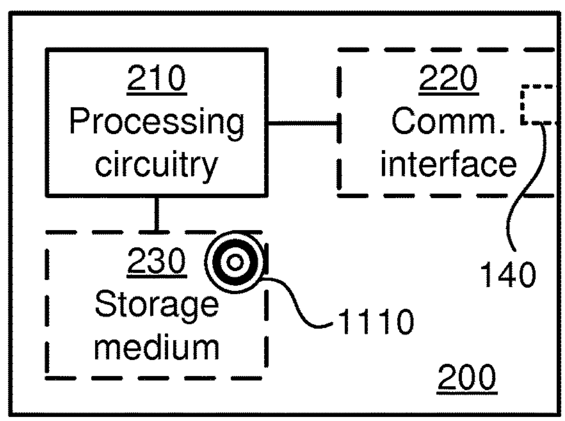
FIG. 9 is a schematic diagram showing functional units of a network node according to an embodiment.

FIG. 9 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110 (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other nodes, devices, entities, and functions of the communications network 100. As such the communications interface 220 may comprise one or more transmitters and receivers, comprising analogue and digital components. The communications interface 220 could optionally comprise the TRP 140.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 10:
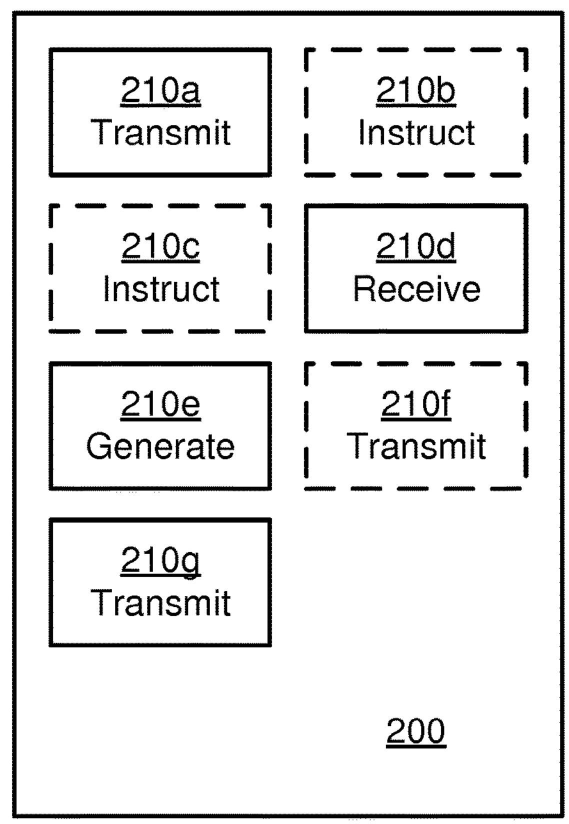
FIG. 10 is a schematic diagram showing functional modules of a network node according to an embodiment.

FIG. 10 schematically illustrates, in terms of a number of functional modules, the components of a network node 200 according to an embodiment. The network node 200 of FIG. 10 comprises a number of functional modules; a transmit module 210*a* configured to perform step S102, a receive module 210*d* configured to perform step S108, a generate module 210*e* configured to perform step S110, and a transmit module configured to perform step S114. The network node 200 of FIG. 10 may further comprise a number of optional functional modules, such as any of an instruct module 210*b* configured to perform step S104, an instruct module 210C configured to perform step S106, and a transmit module 210*f* configured to perform step S112.

In general terms, each functional module 210*a*-210*g* may in one embodiment be implemented only in hardware and in another embodiment with the help of software, i.e., the latter embodiment having computer program instructions stored on the storage medium 230 which when run on the processing circuitry makes the network node 200 perform the corresponding steps mentioned above in conjunction with FIG. 10. It should also be mentioned that even though the modules correspond to parts of a computer program, they do not need to be separate modules therein, but the way in which they are implemented in software is dependent on the programming language used. Preferably, one or more or all functional modules 210*a*-210*g* may be implemented by the processing circuitry 210, possibly in cooperation with the communications interface 220 and/or the storage medium 230. The processing circuitry 210 may thus be configured to from the storage medium 230 fetch instructions as provided by a functional module 210*a*-210*g* and to execute these instructions, thereby performing any steps as disclosed herein.

The network node 200 may be provided as a standalone device or as a part of at least one further device. For example, the network node 200 may be provided in a node of the radio access network 110 or in a node of the core network 120. Alternatively, functionality of the network node 200 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the terminal device 150 than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 9 the processing circuitry 210 may be distributed among a plurality of devices, or nodes. The same applies to the functional modules 210*a*-210*g* of FIG. 10 and the computer program 1120 of FIG. 11).

Figure 11:
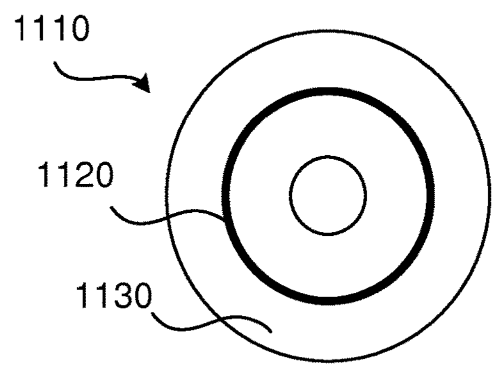
FIG. 11 shows one example of a computer program product comprising computer readable storage medium according to an embodiment.

FIG. 11 shows one example of a computer program product 1110 comprising computer readable storage medium 1130. On this computer readable storage medium 1130, a computer program 1120 can be stored, which computer program 1120 can cause the processing circuitry 210 and thereto operatively coupled entities and devices, such as the communications interface 220 and the storage medium 230, to execute methods according to embodiments described herein. The computer program 1120 and/or computer program product 1110 may thus provide means for performing any steps as herein disclosed.

In the example of FIG. 11, the computer program product 1110 is illustrated as an optical disc, such as a CD (compact disc) or a DVD (digital versatile disc) or a Blu-Ray disc. The computer program product 1110 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120 is here schematically shown as a track on the depicted optical disk, the computer program 1120 can be stored in any way which is suitable for the computer program product 1110.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for beam-formed signal transmission, the method being performed by a network node, the method comprising:

transmitting a reference signal in a set of transmission beams;

receiving reporting from a terminal device having received the reference signal, the reporting identifying N>1 transmission beams in the set of transmission beams;

generating a new transmission beam as a combination of at least two of the N>1 reported transmission beams, generating the new transmission beam comprising determining an antenna weight vector for the new transmission beam, the antenna weight vector for the new transmission beam having a second beam pattern, and the antenna weight vector for the new transmission beam being determined by the second beam pattern that best matches a target beam pattern, each of the at least two of the N>1 reported transmission beams having its own first beam pattern, the target beam pattern being determined from the first beam patterns of the at least two of the N>1 reported transmission beams; and transmitting at least one of control signalling and data signalling in the new transmission beam and to the terminal device.

2. The method according to claim 1, wherein the new transmission beam is generated for a combination only of those of the N>1 reported transmission beams having a reported difference in received power being smaller than a threshold power value.

3. The method according to claim 1, wherein the new transmission beam is generated for a combination only of those of the N>1 reported transmission beams having an angular separation being larger than a first threshold angular value.

4. The method according to claim 1, wherein, when at least two of the N>1 reported transmission beams have an angular separation smaller than a second threshold angular value, the antenna weight vector of the new transmission beam is determined to generate the new transmission beam having one broad main lobe covering the at least two of the N>1 reported transmission beams.

5. The method according to claim 1, wherein the antenna weight vector of the new transmission beam is to be applied to antenna elements of a first polarization and a second polarization, and wherein the antenna weights of the new transmission beam are defined by phase shifts only.

6. The method according to claim 1, further comprising:

instructing the terminal device to, in the reporting, identify only those transmission beams having a spatial correlation being lower than a threshold correlation value when received at the terminal device.

7. The method according to claim 1, wherein the terminal device is to receive the reference signal using at least two antenna arrangements, and wherein the network node is aware of number of antenna arrangements to be used by the terminal device for receiving the reference signal, the method further comprising:

instructing the terminal device to, in the reporting, identify one transmission beam for each one of the at least two antenna arrangements.

8. The method according to claim 1, wherein the reference signal is to be received in a set of receive beams by the terminal device, wherein the network node is aware of number of receive beams in the set of receive beams, and wherein a set of reference signals is transmitted in the set of transmission beams, the set of reference signals consisting of as many occurrences of the reference signal as the number of receive beams.

9. The method according to claim 1, wherein the terminal device is to perform beam training using a set of receive beams on the new transmission beam, wherein the network node is aware of number of receive beams in the set of receive beams, the method further comprising:

transmitting, in the new transmission beam and before transmitting the at least one of control signalling and data signalling, as many occurrences of the reference signal as the number of receive beams.

10. The method according to claim 1, wherein N=2.

11. The method according to claim 1, wherein analog beamforming is utilized by the network node when the new transmission beam is generated.

12. A network node for beam-formed signal transmission, the network node comprising processing circuitry, the processing circuitry being configured to cause the network node to:

transmit a reference signal in a set of transmission beams;

receive reporting from a terminal device having received the reference signal, the reporting identifying N>1 transmission beams in the set of transmission beams;

generate a new transmission beam as a combination of at least two of the N>1 reported transmission beams, the new transmission beam comprising a determined an antenna weight vector for the new transmission beam, and wherein each of the at least two of the N>1 reported transmission beams has its own first beam pattern, the antenna weight vector for the new transmission beam having a second beam pattern, and the antenna weight vector for the new transmission beam being determined by the second beam pattern that best matches a target beam pattern, the target beam pattern being determined from the first beam patterns of the at least two of the N>1 reported transmission beams; and transmit at least one of control signalling and data signalling in the new transmission beam and to the terminal device.

13. The network node according to claim 12, wherein the processing circuitry is further configured to cause the network node to generate the new transmission beam for a combination only of those of the N>1 reported transmission beams having a reported difference in received power being smaller than a threshold power value.

14. The network node according to claim 12, wherein the processing circuitry is further configured to cause the network node to generate the new transmission beam for a combination only of those of the N>1 reported transmission beams having an angular separation being larger than a first threshold angular value.

15. The network node according to claim 12, wherein the processing circuitry is further configured to, when at least two of the N>1 reported transmission beams have an angular separation smaller than a second threshold angular value, cause the network node to determine the antenna weight vector of the new transmission beam to generate the new transmission beam having one broad main lobe covering the at least two of the N>1 reported transmission beams.

16. The network node according to claim 12, wherein the processing circuitry is further configured to cause the network node to apply the antenna weight vector of the new transmission beam to antenna elements of a first polarization and a second polarization, and wherein the antenna weights of the new transmission beam are defined by phase shifts only.

17. The network node according to claim 12, wherein the processing circuitry is further configured to cause the network node to:

instruct the terminal device to, in the reporting, identify only those transmission beams having a spatial correlation being lower than a threshold correlation value when received at the terminal device.

18. The network node according to claim 12, wherein the terminal device is to receive the reference signal using at least two antenna arrangements, and wherein the processing circuitry is further configured to cause the network node to be aware of number of antenna arrangements to be used by the terminal device for receiving the reference signal, the processing circuitry being further configured to cause the network node to:

instruct the terminal device to, in the reporting, identify one transmission beam for each one of the at least two antenna arrangements.

19. The network node according to claim 12, wherein the reference signal is adapted to be received in a set of receive beams by the terminal device, wherein the processing circuitry is further configured to cause the network node to be aware of number of receive beams in the set of receive beams, and wherein a set of reference signals is transmitted in the set of transmission beams, the set of reference signals consisting of as many occurrences of the reference signal as the number of receive beams.

20. The network node according to claim 12, wherein the terminal device is to perform beam training using a set of receive beams on the new transmission beam, wherein the processing circuitry is further configured to cause the network node to be aware of number of receive beams in the set of receive beams, wherein the processing circuitry is further configured to cause the network node to:

transmit, in the new transmission beam and before transmitting the at least one of control signalling and data signalling, as many occurrences of the reference signal as the number of receive beams.

* * * * *